United States Patent [19]

Sandford et al.

[11] 3,933,378
[45] Jan. 20, 1976

[54] QUICK-CONNECT TUBING COUPLING

[75] Inventors: Phillip A. Sandford, Highland Park, Ill.; John D. York, Connersville, Ind.

[73] Assignee: Ford Motor Company, Dearborn, Mich.

[22] Filed: Nov. 29, 1974

[21] Appl. No.: 528,108

[52] U.S. Cl. ............... 285/319; 285/330; 285/331; 285/DIG. 25
[51] Int. Cl.² .......................................... F16L 39/00
[58] Field of Search............ 285/330, 319, DIG. 25, 285/317, DIG. 22, 256, 331, 424

[56] References Cited
UNITED STATES PATENTS

| | | | |
|---|---|---|---|
| 1,533,886 | 4/1925 | Mueller et al. | 285/330 X |
| 2,550,591 | 4/1951 | Parsons | 285/319 |
| 2,789,839 | 4/1957 | Siebert | 285/319 X |
| 3,413,021 | 11/1968 | Potts | 285/330 X |
| 3,453,005 | 7/1969 | Foults | 285/382.4 X |
| 3,549,180 | 12/1970 | MacWilliam | 285/256 |
| 3,826,523 | 7/1974 | Eschbaugh | 285/DIG. 25 |

*Primary Examiner*—Dave W. Arola
*Attorney, Agent, or Firm*—John J. Roethel; Keith L. Zerschling

[57] ABSTRACT

A quick-connect tubing coupling comprising a cup-shaped cage externally attached to a first tube with an end portion of the tube concentrically contained within the cage. The inside diameter of the cage is sufficiently greater than the outside diameter of the tube portion contained therein to provide a space therebetween. The cage has a plurality of axially extending cantilevered leaf springs projecting radially inwardly toward the first tube portion, some of the leaf springs being longer than the others.

A second tube is outwardly cupped at one end to encapsulate an O-ring, the cupped end portion of the second tube being concentrically received between the cage and the first tube end portion. The cupped end of the second tube provides a shoulder behind which the longer leaf springs can lock with the O-ring in a sealed mode or behind which the shorter leaf springs can lock with the first and second tubes axially displaced to provide a pressure relief vent. Interengageable positioning means on the first and second tubes provide an anti-rotational interlock therebetween.

1 Claim, 3 Drawing Figures

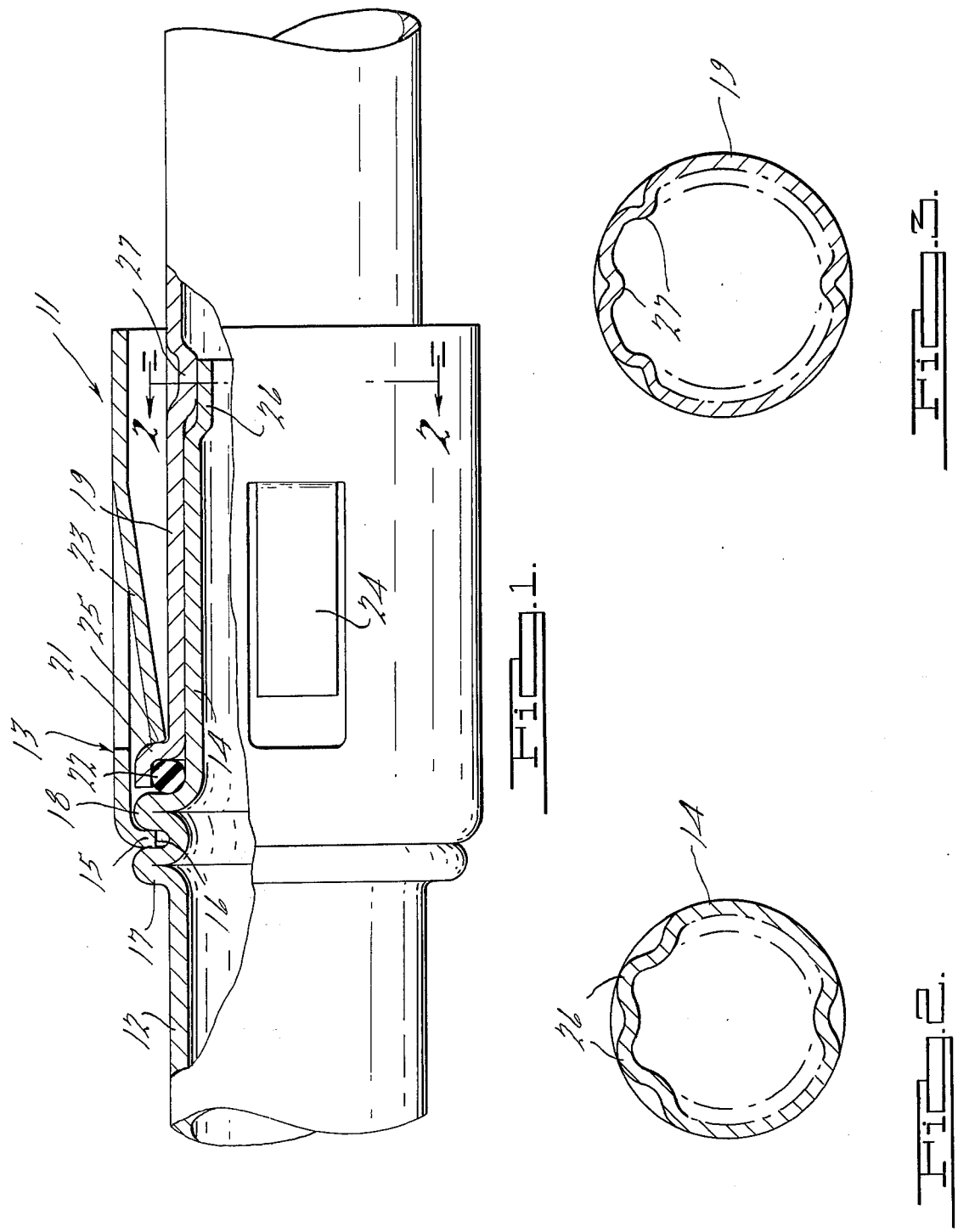

QUICK-CONNECT TUBING COUPLING

BACKGROUND OF THE INVENTION

In many automotive, household appliance and machine tool applications, fluid conduits or tubes that carry pressurized fluids must be capable of being disconnected to permit repair or replacement of components of the system. To facilitate initial connection and subsequent disconnection, there has been developed a class of quick-connect fittings or tube coupling devices as exemplified by the disclosure of U.S. Pat. No. 3,711,125 issued Jan. 16, 1973 to David C. Dehar for a "Quick-Connect Fitting for a Hydraulic Conduit."

One apparent disadvantage of the quick-connect or disconnect fitting shown in this patent is that no provision appears to have been made for venting or releasing any residual pressure in the conduit or tubing before the fitting is disconnected whereupon the connection may come apart more quickly than is desired or expected. This problem was recognized in the disclosure of U.S. Pat. No. 3,718,350 issued Feb. 27, 1973 to Lee F. Klein for a "Snap Ring Coupling." The Klein patent discloses a disconnect fitting "having an intermediate disconnect position in which the pressure may leak off from the conduits but the coupling will not be forcibly disconnected by the pressure contained in the conduit system."

It is an object of the present invention to provide an improved potentially reliable, low cost, easy to assemble, leak-tight, quick-connect, fluid fitting or coupling which does not require assembly tools to make the connection. It is a further object to provide an improved fitting or coupling having a safe, nearly foolproof, diverted pressure venting-before-release during disassembly. It is yet a further object that the improved fitting or coupling will have low susceptibility to unintentional disassembly, yet may be easily disassembled with a special tool or with two common screwdrivers, if necessary.

SUMMARY OF THE INVENTION

The present invention relates to a quick-connect tubing coupling comprising a cup-shaped cage externally attached to a first tube with an end portion of the tube concentrically contained within the cage. The inside diameter of the cage is sufficiently greater than the outside diameter of the portion of the tube contained therein to provide a space therebetween. The cage has a plurality of axially extending cantilevered leaf springs projecting-radially inwardly toward the end portion of the first tube contained therein, some of the leaf springs being longer than the others.

A second tube to be coupled to the first tube is outwardly cupped at one end to encapsulate an O-ring, the cupped end portion of the second tube being concentrically received between the cage and the first tube end portion. The cupped end of the second tube provides a shoulder behind which the longer leaf springs can lock with the O-ring in a sealed mode or behind which the shorter leaf springs can lock with the first and second tubes axially displaced to provide a pressure relief vent. Interengageable positioning means on the first and second tubes preferably provide an anti-rotational interlock therebetween.

DESCRIPTION OF THE DRAWING

Further features and advantages of the present invention will be made more apparent as this description proceeds, reference being had to the accompanying drawing, wherein:

FIG. 1 is an assembly view in part sectional of the tube coupling embodying the present invention;

FIG. 2 is a cross-sectional view of one tube element taken substantially on the line 2—2 of FIG. 1; and FIG. 3 is a cross-sectional view of the other tube element taken substantially on the line 2—2 of FIG. 1.

DETAILED DESCRIPTION OF THE INVENTION

Referring now to the drawing, in FIG. 1 the reference numeral 11 designates generally the quick-connect tube coupling assembly embodying the present invention. The assembly 11 comprises a first tube 12 having a cup shaped cage 13 externally attached thereto, an end portion 14 of the first tube 12 being concentrically contained within the cage 13. The cup-shaped cage 13 has a base wall 15 apertured at 16 to receive the tube 12. The cage 13 is retained on the tube by upset beads 17–18 which are roll-formed with the cage in place. The upset beads 17–18 abut the outer and inner surfaces of the base wall 15 and hold the cage 13 against axial movement on the tube 12.

The end portion 14 of tube 12 is of reduced diameter compared to the normal diameter of the tube. The important relationship, however, is that the inside diameter of the cage 13 is sufficiently greater than the outside diameter of the tube 12 to provide a space to receive a second tube 19 therebetween.

The second tube 19 has a cupped end 21 adapted to encapsulate an O-ring 22. The cupped end 21 of the tube 19 is concentrically received between the cage 13 and the end portion 14 of tube 12. The cage 13 has a plurality of axially extending cantilevered leaf springs. As shown in FIG. 1, the springs are of two lengths. Spring 23 is somewhat longer than spring 24. Preferably, each of the springs 23–24 has a diametrically opposed counterpart (not visible).

The cupped end 21 of tube 19 provides a shoulder 25 behind which the pairs of leaf springs 23 and 24 are adapted to lock. In assembled condition, as shown in FIG. 1, springs 23 are adapted to lock behind the shoulder 25 to maintain the O-ring in a compressed or sealed mode.

The springs 24 are adapted to lock behind the shoulder 25 when it is desired to disconnect the tubes 12 and 19. Such disconnection may be accomplished by inserting a special tool (or the blades of a pair of common screwdrivers) into the space between the tube 19 and the cage 13 to lift the springs 23 above the shoulder 25 on the cupped end 21 of the tube 19. The tube 19 then may be axially moved relative to the tube 12 until the ends of the short springs 24 abut the shoulder 25. The purpose of this secondary stop is to provide a means of venting whatever residual pressure may be contained within the tubes 12 and 19. The residual fluid will travel between the abutting tube walls, and past the O-ring and then be evacuated to the atmosphere. The relationship of the springs 24 to the shoulder 25 thus prevents any sudden or unexpected separation of the tubes 12-19 upon disengagement of the springs 23 from the shoulder 25. To complete the disengagement of the tubes 12-19, it then only is necessary to lift the springs 24 by use of the special tool or pair of common screwdrivers and the tube 19 may then be completely withdrawn from the cage 13.

The assembly or coupling of the tubes 12-19 is quite simply accomplished without any tools. The cupped end 21 of tube 19 is concentrically aligned with the space between end portions 14 of tube 12 and the cage 13. The cupped end 21 is then forced into the space causing first the springs 24 and then the springs 23 to be deflected outwardly as the cupped end passes therebeneath. Sufficient force must be applied to cause the O-ring to be compressed sufficiently for the springs 23 to lock behind the cupped shoulder 25 thereby providing a seal between the tubes 12-19. Any vibrations in the system will cause the leaf springs 23 to creep downward on the shoulders 25 to increase the clamping force.

As shown in FIGS. 2 and 3, the tubes 12 and 19 are provided with complementary splined portions 26 and 27 which in assembled position of the tubes are interlocked with each other. These splines or anti-rotational elements are provided to prevent O-ring abrasion or metal fretting of abutting tube surfaces.

It is to be understood this invention is not limited to the exact constructions illustrated and described above, but that various changes and modifications may be made without departing from the spirit and scope of the invention as defined by the following claims.

We claim:
1. A quick-connect tubing coupling comprising:
    a first tube having a cup-shaped cage externally attached thereto,
    the cup-shaped cage having an opened end and an apertured base wall spaced from the opened end through which aperture an end portion of first tube projects into the cage,
    the first tube having spaced upset beads projecting externally from its outer surface and engaged with the outer and inner sides of the base wall of the cage holding the latter against axial movement,
    the inside diameter of the cage being sufficiently greater than the outside diameter of the tube end portion contained therewithin to provide a space therebetween,
    the cage having a plurality of cantilevered leaf springs that extend axially from the cage open end toward its base wall and that project radially inwardly toward the tube end portion within the cage,
    some of the leaf springs being longer than the others,
    an O-ring positioned on the tube end portion contained within said cage,
    a second tube outwardly cupped at one end to encapsulate said O-ring,
    the cupped end of the second tube being concentrically received between the cage and the first tube end portion,
    the cupped end of the second tube providing a shoulder behind which the longer leaf springs can lock with said O-ring compressed in a sealed mode between said cupped end and the upset bead engaging the inner side of the base wall or behind which the shorter leaf springs can lock with the first and second tubes axially displaced so that said O-ring is released from its sealed mode to provide a pressure relief vent.

* * * * *